United States Patent [19]

Wittler et al.

[11] 4,252,039
[45] Feb. 24, 1981

[54] SILENT BAR STOCK FEEDER

[75] Inventors: Fritz Wittler, Bielefeld; Reinhard Bollman, Bünde, both of Fed. Rep. of Germany

[73] Assignee: Apparatebau Spradow G.m.b.H., Fed. Rep. of Germany

[21] Appl. No.: 8,140

[22] Filed: Jan. 31, 1979

Related U.S. Application Data

[63] Continuation of Ser. No. 786,289, Apr. 11, 1977.

[30] Foreign Application Priority Data

Jul. 5, 1976 [DE] Fed. Rep. of Germany ....... 2630156

[51] Int. Cl.³ .................. B23B 25/00; B65H 17/22; B23Q 5/23
[52] U.S. Cl. .................. 82/38 A; 226/176; 414/431
[58] Field of Search .............. 414/431, 432; 226/179, 226/181, 186, 187, 189, 198, 199, 176, 177; 82/38 R, 38 A

[56] References Cited

U.S. PATENT DOCUMENTS

| | | | |
|---|---|---|---|
| 2,538,950 | 1/1951 | Schryber | 414/432 |
| 2,871,011 | 1/1959 | Hercik | 226/179 |
| 3,346,130 | 10/1967 | Wloszek | 414/432 |
| 3,535,963 | 10/1970 | Dietl | 82/38 R |
| 3,708,079 | 1/1973 | Wloszek | 414/431 |
| 3,791,564 | 2/1974 | Hugonin | 226/186 |
| 3,836,028 | 9/1974 | Austin | 414/431 |
| 3,871,618 | 3/1975 | Funk | 226/187 |
| 3,970,204 | 7/1976 | Lutz | 414/432 |
| 3,986,652 | 10/1976 | Perkins | 226/181 |
| 4,000,797 | 1/1977 | Ducanis | 226/187 |
| 4,018,011 | 4/1977 | Whittenberg | 414/432 |

FOREIGN PATENT DOCUMENTS 216208 8/1941 Switzerland .............. 414/431

Primary Examiner—Harrison L. Hinson
Attorney, Agent, or Firm—William A Drucker

[57] ABSTRACT

A silent feeder for revolving bar stock has a horizontal elongated feed bed with a beam supported by plural columns. Spaced adjustable holders are mounted on the feed bed at opposite sides of the stock, and each holder has a plurality of rollers bearing on the circumference of the bar stock, the rollers being preferably resiliently loaded radially of the bar stock.

2 Claims, 7 Drawing Figures

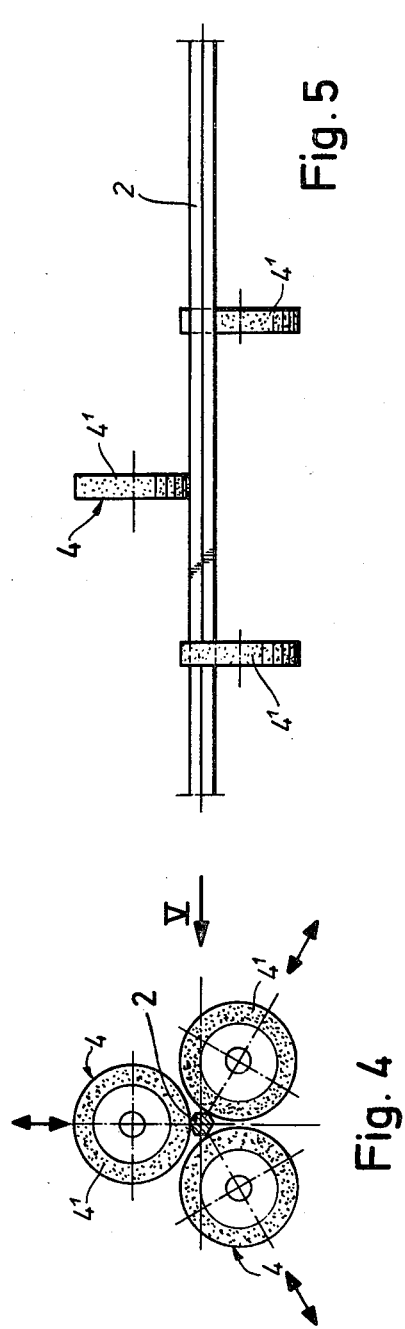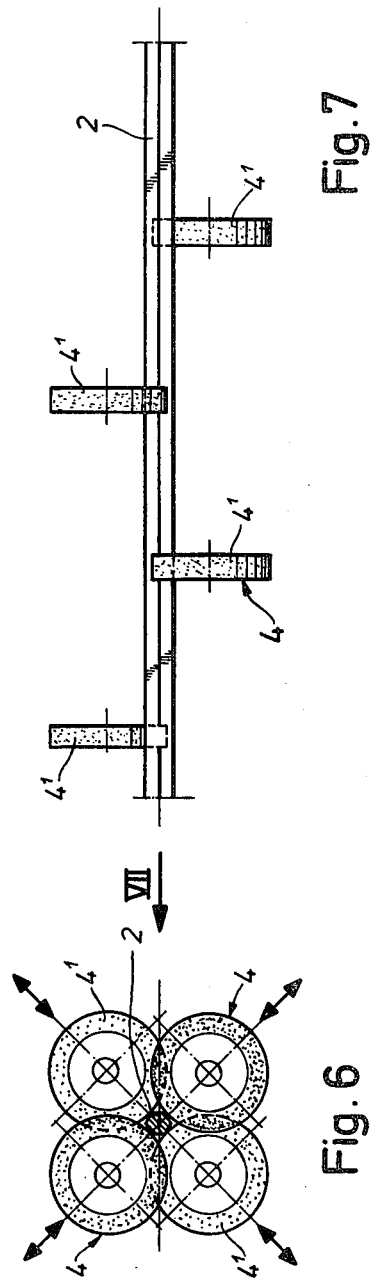

SILENT BAR STOCK FEEDER

This is a continuation of Ser. No. 786,289 filed Apr. 11, 1977.

This invention relates to a silent feeder for revolving bar stock, comprising a horizontal elongated feed bed in the form of a beam supported at or near each end by a column, for screw or like turning machines.

BACKGROUND OF THE INVENTION

Feeders for feeding workpieces in the metal processing industries have recently been proposed in which a reduction of noise is the object. In these arrangements a bar stock is fed through the interior of tubes. However, in practice it transpires that as soon as the bars begin to revolve inside their tubes they still generate a considerable amount of unwelcome noise. The volume of this noise depends upon the cross section of the bar stock that is to be machined. In other words, if the bar stock has a polygonal cross section, e.g. a hexagonal, octagonal or dodecagonal cross section, the generated noise, compared with that generated by bars of circular cross section becomes progressively greater.

For the purpose of muffling the loud noise that arises when the bar stock is rotated, an expedient that has been tried is to provide the inside surface of the conveying tubes with a lining of rubber or of some such material that has a sound absorbing effect.

Work feed tubes are also known which contain a coil spring that can be withdrawn in the radial direction and that is intended to prevent the bar material from clanging against the inside of the tube.

Moreover, for more silently feeding a bar stock tubes have been used which contain displaceable sleeves resembling bushes.

However, all the above describing devices for reducing the noise of feeding bar stock suffer from the common drawback that the bars which may often not be exactly horizontal are responsible for a high rate of wear of the sound suppressing materials and the associated machine elements. This is so more particularly in the case of feeder tubes for bar stock containing an internal lining.

Moreover, owing to the direct or indirect contact that takes place between the feeding bar stock and the feeder tube it is impossible to prevent the build-up of vibrations which contrary to the desired sound suppressing effect tend to amplify and intensify the noise. Furthermore, known types of feeders for bar stock do not ensure that the bars move centrally through the feeder. This has an adverse effect upon the production of precision components from the stock.

Another drawback is that if trouble should arise in the feeder, the preferably divided tube must be opened. This causes loss of time and therefore increases costs.

A noise reducing bar stock feeder has also been proposed which differs from other devices in that a plurality of mounts each provided with an axial bore are located at equidistant intervals on a beam, each mount containing three bearing balls which make contact with the bar. Each ball is rotatably mounted on an eccentric pin. A feeder tube provided with an internal lining is not used in this arrangement.

It is a defect of this latter arrangement that the diameter of the openings for the passage therethrough of the bars determines the diameters or overall dimensions of the bars the feeder can handle. Another defect is that bar stock having a profiled cross section is altogether unsuitable for such a feeder.

OBJECT OF THE INVENTION

In view of the above-mentioned drawbacks and defects of known devices it is the object of the present invention to provide a silent feeder for bar stock which is an improvement in relation to the existing state of the art.

SUMMARY OF THE INVENTION

To attain this object the present invention provides a silent feeder for revolving bar stock comprising a horizontal elongated feed bed in the form of a beam supported at or near each end by a column, for screw or like turning machines, and mounted on the feed bed a plurality of relatively spaced adjustable holders alternately on opposite sides of the bar stock, each holder carrying several rollers which have treads bearing on the circumference of the bar stock, and which are loaded radially of the feeding bar stock.

Another feature of the invention consists in yieldingly mounting the rollers in their holders so that they can be adjusted in the axial and radial direction of the bar stock.

The means for loading the rollers may be compression springs, hydraulic or pneumatic cylinders and like devices.

The tread of each roller which runs in ball bearings consists throughout its width and depth of an elastic abrasion-resistant material, such as rubber or a synthetic plastics.

Finally, it may be mentioned that the holders carrying the rollers may themselves be adjustable and lockable lengthwise of the beam forming the feed bed.

Other objects, features, and advantages of the invention will be more readily understood from the following description of two embodiments thereof given purely by way of example and shown in the accompanying drawings.

BRIEF DESCRIPTION OF THE DRAWINGS

In the drawings:

FIG. 4 is a larger scale axial diagrammatic view of three pressure rollers guiding a bar centrally between them;

FIG. 5 is a side view of the arrangement according to FIG. 4;

FIG. 6 is a similar representation to that in FIG. 4 comprising four pressure rollers, and FIG. 7 is a side view of the arrangement in FIG. 6.

DESCRIPTION OF THE PREFERRED EMBODIMENTS

Figure 1:
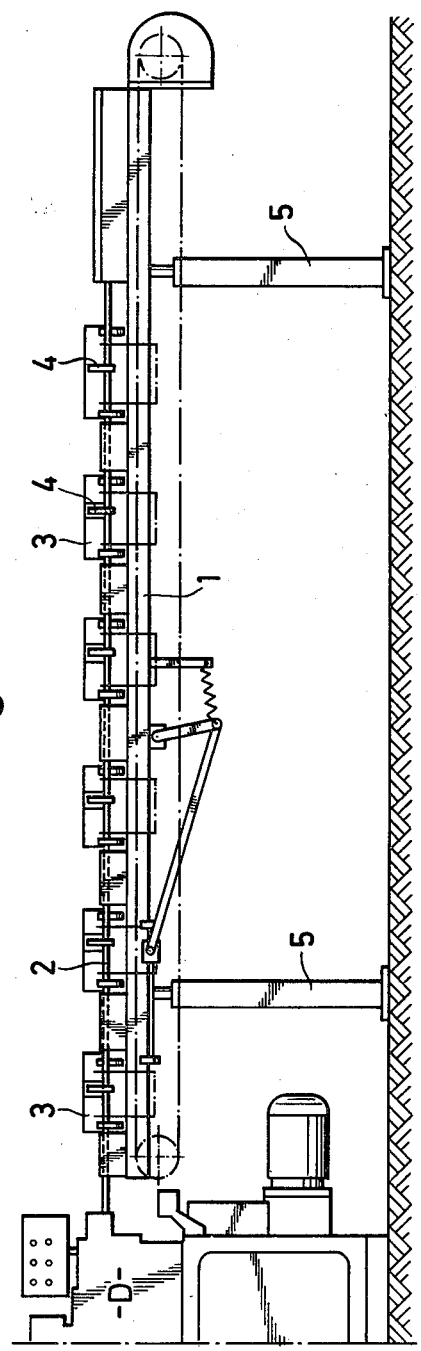
FIG. 1 is a side elevational view of a feeder for bar stock.
Figure 2:
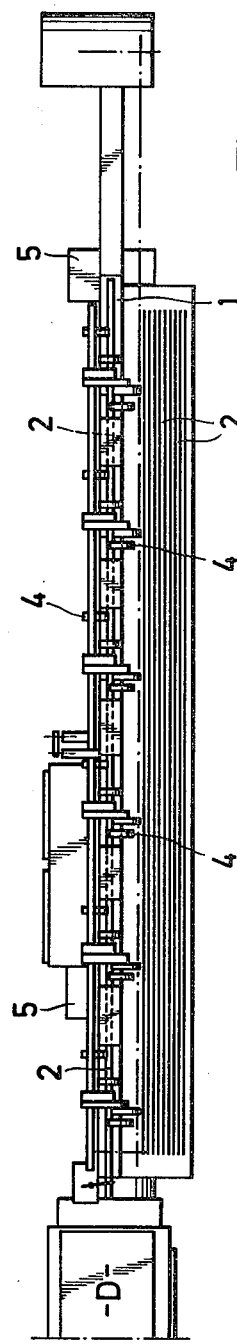
FIG. 2 is a view of FIG. 1 from above.
Figure 3:
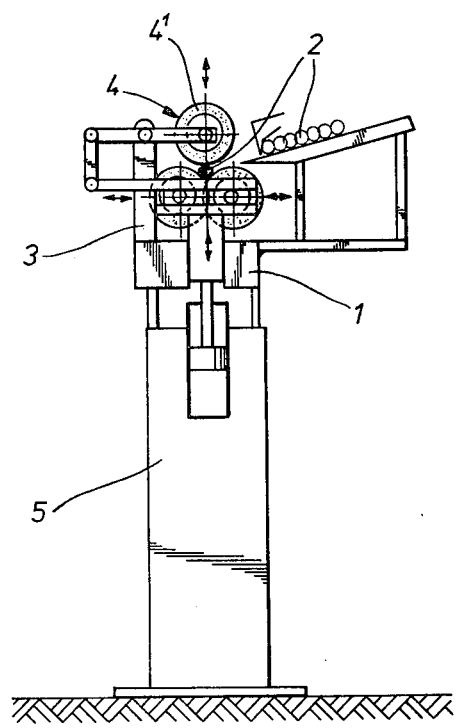
FIG. 3 is an end view of the feeder in FIG. 1.

A feeder for bar stock is provided in axial alignment with a conventional screw machine D. Substantially the feeder comprises an elongated feed bed in the form of a beam 1 supported at each end on a column 5. The illustrated feeder further incorporates a mechanical conveyor means for advancing the bar stock 2 in the horizontal. Since such conveyor means are a conventional component of a bar stock feeder, a detailed description thereof can be dispensed with.

According to the invention the beam 1 forming the feed bed carries holders 3 for movably mounted radially loaded pressure rollers 4. The means for loading the pressure rollers 4 may be springs, hydraulic cylinders or the like. The holders 3 are mounted on the feeder beam 1 in such a way t at the pressure rollers 4 are situated alternately on the left and on the right hand side of and above the bars 2.

The holders 3 can be horizontally displaced on the feeder beam 1. As already mentioned the pressure rollers 4 are adjustably mounted in their holders 3 to enable them to be adjusted to the diameter of the bar stock that is to be machined. Each pressure roller 4 is adjusted that the treads $4^1$ of three or four such rollers make contact with the circumferential surface of the bar stock 2. In order to allow for the differences in the diameter of polygonal bar stock 2 the pressure rollers 4 are not only adjustable in the axial and radial directions but they also have a tread $4^1$ which throughout its width and thickness consists of a yielding but abrasion-resistant material, such as rubber or a synthetic plastics material. This ensures that when the bar stock 2 revolves the treads $4^1$ of the pressure rollers 4 will seek to maintain contact therewith and the pressure of the rollers 4 will be applied to all the faces and edges of polygonal stock 2.

Owing to the above described nature of the treads $4^1$ noise which the bars 2 would otherwise generate is suppressed by the treads $4^1$ and reduced to a minimum. It should here be remembered that in a screw machine operating on a hexagonal bar 2 rotating at 5000 r.p.m. each tread $4^1$ will contact the bar 30 000 times every minute. For the purpose of preventing wear of the tread $4^1$ the latter must consist of an abrasion-resistant material, as already stated.

In order to align the bar stock 2 in the feeder and to prevent whipping, the pressure rollers 4 may be mounted in their holders 3 in such a way that each roller applies radial pressure to the bar 2 from a different direction. The difference between these directions of application of pressure operates to centralise and align the rotating bar 2 and thus results in satisfactory machining and the generation of very little noise in the feeder.

In conclusion it may be said that the present invention enables bar stock even if this has an irregular or polygonal contour to be fed to a screw machine with the substantial elimination of undesirable noise.

We claim:

1. A device, for feeding bar stock material along a linear feed path line to a bar processing machine, comprising:
   (i) a feeder beam extending the entire length of a feed path line of the device,
   (ii) a plurality of holders mounted on said feeder beam and positioned at intervals along said feeder beam,
   (iii) at least three pressure rollers carried by each holder, said pressure rollers of each holder being spaced each from the next along the feed path line and including at least one pair which are on alternate sides of the feed path line, said pressure rollers having their respective axes of rotation parallel to the feed path line, said pressure rollers each having a tread made of a resilient abrasion-resistant material for contacting bar stock passed along said feed path line,
   (iv) resilient loading means on each said holder acting on the pressure rollers to urge said rollers towards the feed path line.

2. The device of claim 1 wherein each holder of said plurality of holders is adjustable along said feeder beam.

* * * * *